US008994384B2

(12) United States Patent
Furukawa

(10) Patent No.: US 8,994,384 B2
(45) Date of Patent: Mar. 31, 2015

(54) POWDER SENSOR

(71) Applicant: TDK Corporation, Tokyo (JP)

(72) Inventor: Nobuo Furukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 210 days.

(21) Appl. No.: 13/658,364

(22) Filed: Oct. 23, 2012

(65) Prior Publication Data

US 2013/0106445 A1 May 2, 2013

(30) Foreign Application Priority Data

Oct. 26, 2011 (JP) ................................ 2011-234944
Dec. 16, 2011 (JP) ................................ 2011-276438

(51) Int. Cl.
*G01N 27/00* (2006.01)
*G03G 15/08* (2006.01)

(52) U.S. Cl.
CPC .................................... *G03G 15/086* (2013.01)
USPC ....... 324/682; 324/76.62; 324/71.4; 324/116; 324/153; 324/214; 324/464

(58) Field of Classification Search
CPC .......... H04R 3/04; H04R 29/00; H04R 3/002; A61B 17/1628; A61B 17/1657; A61K 31/5575; A61K 31/5585; A61K 47/48969; B06B 1/0261; B06B 2201/55; B06B 2201/76; B41J 2202/06; B41J 2/115; B60C 23/0428; B60C 23/0498; B60C 23/20; B82Y 15/00; B82Y 5/00; F15C 1/005; G01B 11/022; G01B 11/2433; G01B 7/012; G01C 19/5607; G01C 19/5677; G01D 15/18; G01F 1/3281; G01F 1/329; G01N 11/162; G01N 2009/004; G01N 2203/0051; G01N 2291/011; G01N 2291/02433; G01N 2291/0256; G01N 2291/02809; G01N 2291/02872; G01N 2291/0423; G01N 29/022; G01N 29/024; G01N 29/036; G01N 29/341; G01N 3/38; G01N 9/002; G01P 15/125; G01R 15/241; G01S 17/026; G01S 17/10; G01S 7/497; G03G 15/0824; G03G 15/0831; G03G 15/0832; G03G 15/0848; G03G 15/086; G03G 15/2096; G03G 2215/00987; G03G 2215/0695; G03G 11/1008; H03B 5/32; Y10S 310/80
USPC ........ 324/682, 76.52, 76.53, 76.77, 521, 617, 324/622, 683, 709
See application file for complete search history.

(56) References Cited

U.S. PATENT DOCUMENTS

| | | | | |
|---|---|---|---|---|
| 3,953,844 | A * | 4/1976 | Barr et al. | 340/627 |
| 4,214,243 | A * | 7/1980 | Patterson | 342/115 |

(Continued)

FOREIGN PATENT DOCUMENTS

| | | | |
|---|---|---|---|
| JP | 3-37592 | | 2/1991 |
| JP | 4-127183 | A | 4/1992 |

(Continued)

OTHER PUBLICATIONS

Machine Translation of JP 2928273 B2, Title: Powder Sensor, Inventors: Wada Takashi and Sasaki Kaoru, Date: Aug. 3, 1999.*

*Primary Examiner* — Arleen M Vazquez
*Assistant Examiner* — Lee Rodak
(74) *Attorney, Agent, or Firm* — Leydig, Voit & Mayer, Ltd.

(57) ABSTRACT

A powder sensor includes a piezoelectric element, an oscillator circuit, a phase determination circuit, and a powder presence/absence determination circuit. The oscillator circuit applies to the piezoelectric element an output signal having a frequency equal to or near a resonance frequency of the piezoelectric element. The phase determination circuit determines phase of a terminal voltage of the piezoelectric element relative to phase of the output signal from the oscillator circuit. The powder presence/absence determination circuit determines that powder is absent if the phase determination circuit determines, n consecutive times (where "n" is an arbitrary integer satisfying $n \geq 2$), that the phase of the terminal voltage of the piezoelectric element, relative to the phase of the output signal from the oscillator circuit, satisfies a predetermined condition.

6 Claims, 7 Drawing Sheets

(56) References Cited

U.S. PATENT DOCUMENTS

| | | | |
|---|---|---|---|
| 5,438,393 | A | 8/1995 | Komatsu et al. |
| 2006/0108514 | A1 | 5/2006 | Maruyama |

FOREIGN PATENT DOCUMENTS

| | | | | | |
|---|---|---|---|---|---|
| JP | 6-27065 | | 2/1994 | | |
| JP | 6-59049 | | 3/1994 | | |
| JP | 6-160266 | | 6/1994 | | |
| JP | 6-167437 | | 6/1994 | | |
| JP | 2928273 | B2 * | 8/1999 | ............... | G01G 3/16 |
| JP | 2006-145483 | A | 6/2006 | | |
| JP | 2011-27778 | | 2/2011 | | |

* cited by examiner

POWDER SENSOR

BACKGROUND OF THE INVENTION

1. Field of the Invention

The present invention relates to a powder sensor for detecting powder such as photocopier toner.

2. Description of the Related Art

Toner used in a photocopier for example is more consumed according as the number of photocopies increases and hence the remaining amount thereof needs to be detected at all times so that toner is newly supplied if the remaining amount reduces to a proper amount. A powder sensor is known that detects the presence/absence of the powder for this end.

The powder sensor of Japanese Laid-Open Patent Publication No. 3-37592 includes a powder sensor element (two-terminal piezoelectric element), a sweep oscillator circuit connected via a resistor to an input of the powder sensor element, a phase comparison unit that performs a phase comparison between a terminal voltage of the powder sensor element and a drive pulse signal from the sweep oscillator circuit, and a phase discrimination unit that discriminates the result of this comparison to detect the presence/absence of the powder. Specifically, a detected phase difference is latched into a register e.g. as level 0 when it is 80° to 90° and as level 1 when 0° to 10° based on a previously set threshold value of 45°, to output a detection signal as a digital signal depending on the presence/absence of the powder.

The conventional detection method brings about no problem in the common environment. However, in a particular environment, e.g., in case a large vibration or shock is applied due to assembly, adjustment, or other factors of a photocopier, the conventional detection method may cause a temporary shift in the phase of the terminal voltage of the powder sensor element, which may result in an misjudgment that powder is absent regardless of the presence of powder depending on the extent of the shift. With the progress of size reduction in OA equipment such as the photocopier, the powder sensor element becomes susceptible to the influence of a vibration originating from a motor in the paper feed, which may be a cause of the misjudgment.

SUMMARY OF THE INVENTION

The present invention has been made in view of the foregoing circumstances and problems, and an object thereof is to provide a powder sensor capable of reducing or eliminating a misjudgment that may occur when a vibration or shock is applied, as compared with the prior art.

In an aspect of the present invention, a powder sensor includes a piezoelectric element, an oscillator circuit, a phase judgment circuit, and a powder presence/absence judgment circuit. The oscillator circuit applies to the piezoelectric element an output signal having a frequency equal to or near a resonance frequency of the piezoelectric element. The phase judgment circuit judges a phase of a terminal voltage of the piezoelectric element relative to a phase of the output signal from the oscillator circuit. The powder presence/absence judgment circuit judges whether powder is present or absent based on the result of a judgment in the phase judgment circuit. The powder presence/absence judgment circuit makes a judgment that powder is absent if the phase judgment circuit makes a judgment n (where "n" is an arbitrary integer satisfying $n \geq 2$) consecutive times that the phase of the terminal voltage of the piezoelectric element relative to the output signal from the oscillator circuit satisfies a predetermined condition.

In the powder sensor, the powder presence/absence judgment circuit may make a judgment that powder is absent if the phase judgment circuit makes a judgment n consecutive times that a phase lag of the terminal voltage of the piezoelectric element relative to the output signal from the oscillator circuit is less than or equal to a predetermined angle.

In the powder sensor, the powder presence/absence judgment circuit may make a judgment that powder is absent if the phase judgment circuit makes a judgment n consecutive times that there is a phase lead of the terminal voltage of the piezoelectric element relative to the output signal from the oscillator circuit.

The powder sensor according to claim 1, wherein the oscillator circuit may be a sweep oscillator circuit that sweeps a frequency of the output signal through a frequency range inclusive of a resonance frequency of the piezoelectric element.

The powder sensor according to claim 1, wherein the phase judgment circuit may include a n-stage shift register, and wherein the powder presence/absence judgment circuit may include a logic gate that receives, as its input, output signals from the n-stage shift register.

It is to be noted that any arbitrary combination of the above-described structural components as well as the expressions according to the present invention changed among a system and so forth are all effective as and encompassed by the present aspect.

According to the aspect described above, a misjudgment that may occur when a vibration or shock is applied can be reduced or eliminated, as compared with the prior art.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, the drawings in which.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

Figure 1:
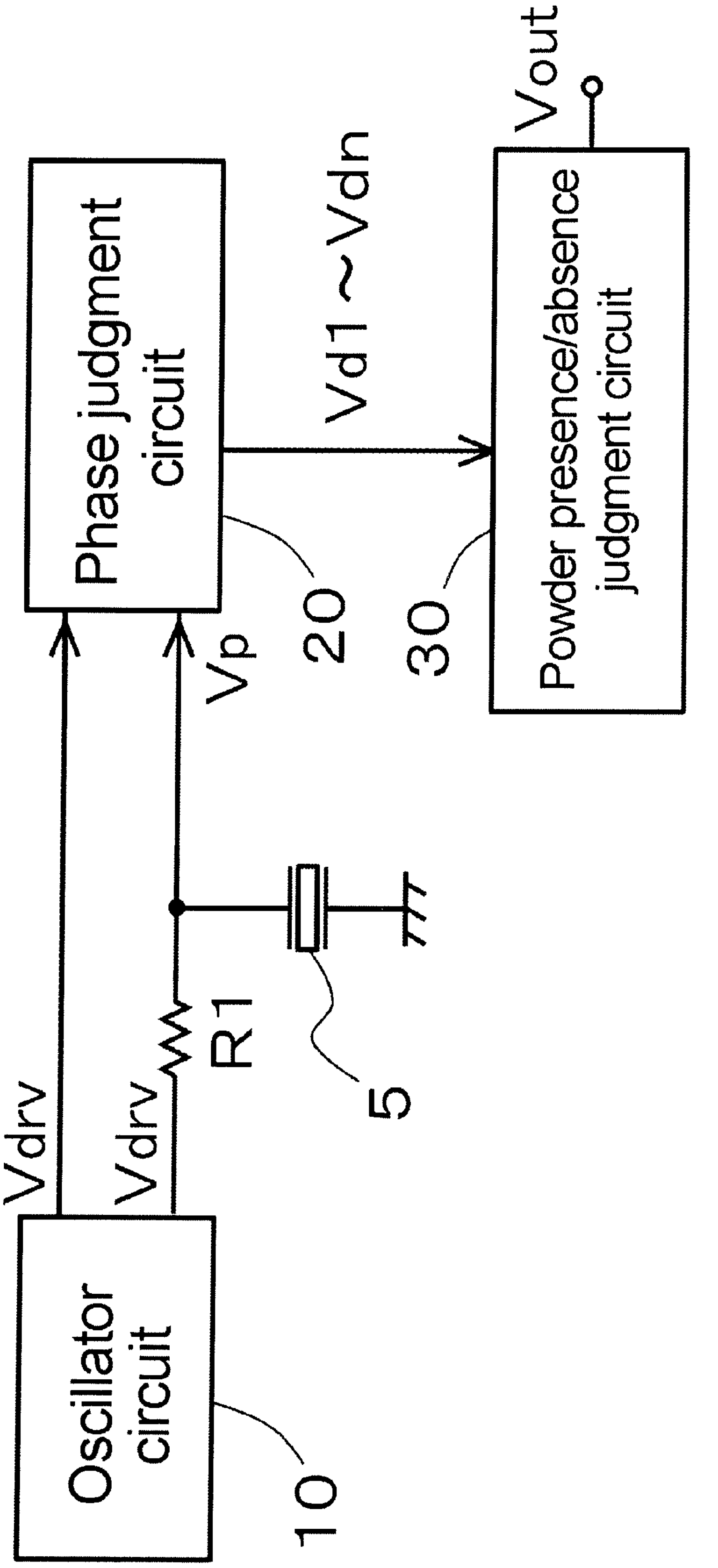
FIG. 1 is a block diagram of a toner sensor according to an embodiment of the present invention.

FIG. 1 is a block diagram of a toner sensor as a powder sensor according to an embodiment of the present invention. The toner sensor includes a piezoelectric element 5, an oscillator circuit 10, a phase judgment circuit 20, and a powder presence/absence judgment circuit 30.

Figure 2:
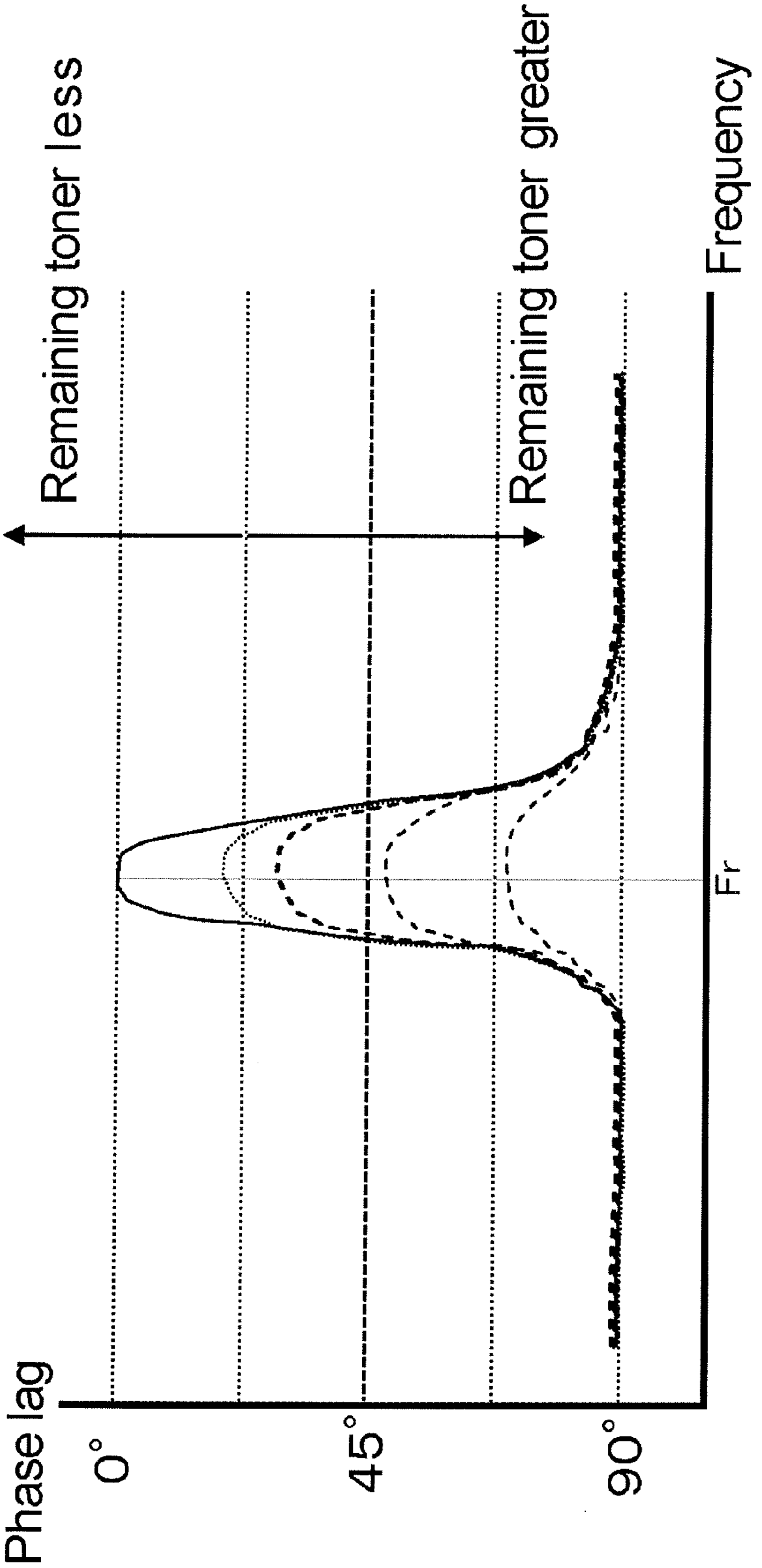
FIG. 2 is a phase lag characteristic diagram with respect to the frequency of an input signal from a piezoelectric element shown in FIG. 1.

The piezoelectric element 5 is fitted to a toner box and has a phase lag relative to an input signal depending on the frequency of the input signal and the remaining amount of toner. Phase lag characteristics with respect to the input signal frequency are as shown in FIG. 2.

With respect to an input signal having a resonance frequency Fr, the piezoelectric element 5 has no phase shift since the piezoelectric element 5 becomes resonant due to its efficient inductance (L)-capacitance (C) energy exchange in the vicinity of the resonance frequency Fr. According as the input signal frequency goes away from the resonance frequency Fr, however, the piezoelectric element 5 comes to have a larger phase lag due to its increased capacitance characteristics. According as a greater amount of toner remains in the toner box, the oscillation of the piezoelectric element 5 is obstructed to a greater extent, resulting in increased capacitance characteristics even with respect to the input signal having the resonance frequency Fr or a frequency near the resonance frequency Fr. On the other hand, according as toner in the toner box approaches zero, the piezoelectric element 5 comes to have a remarkably reduced phase lag with respect to the input signal having the resonance frequency Fr or a frequency near the resonance frequency Fr.

The oscillator circuit 10 applies its output signal Vdrv (voltage signal) having a frequency equal to or near the resonance frequency Fr of the piezoelectric element 5 via a resistor (limiting resistor) R1 to the piezoelectric element 5. The oscillator circuit 10 preferably sweeps the frequency of the output signal Vdrv within a frequency range inclusive of the resonance frequency Fr of the piezoelectric element 5. Sweeping is effective when the resonance frequency of the piezoelectric element 5 fitted to the toner box cannot be accurately specified.

The phase judgment circuit 20 compares a phase of the output signal Vdrv from the oscillator circuit 10 with a phase of a terminal voltage Vp of the piezoelectric element 5 to judge whether the phase of the terminal voltage Vp of the piezoelectric element 5 is delayed or advanced relative to the phase of the output signal Vdrv from the oscillator circuit 10 (namely, whether the phase of a terminal voltage Vp satisfies a predetermined condition or not). The comparison is carried out in every signal cycle of the output signal Vdrv from the oscillator circuit 10 (e.g., taking every rise of the output signal Vdrv as a trigger). Results of most recent n ("n" is any integer satisfying $n \geq 2$) consecutive comparisons are retained as phase comparison result signals Vd1 to Vdn in the phase judgment circuit 20. The phase comparison result signals Vd1 to Vdn are input from the phase judgment circuit 20 into the powder presence/absence judgment circuit 30. The phase comparison result signals Vd1 to Vdn are each a binary signal having different levels depending on whether the terminal voltage Vp of the piezoelectric element 5 has a phase lag or a phase lead relative to the output signal Vdrv from the oscillator circuit 10 and, every time the comparison is performed, are updated in sequence.

Based on the input phase comparison result signals Vd1 to Vdn, the powder presence/absence judgment circuit 30 judges the presence/absence of toner in the toner box. Specifically, the powder presence/absence judgment circuit 30 judges toner to be absent if all of the phase comparison result signals Vd1 to Vdn indicate the phase lead of the terminal voltage Vp of the piezoelectric element 5 (and issues a judgment result signal Vout having a level different from that when the condition is not satisfied). In other words, the powder presence/absence judgment circuit 30 makes a judgment that toner is absent if the phase judgment circuit 20 makes a judgment n consecutive times that there is a phase lead of the terminal voltage Vp of the piezoelectric element 5 relative to the output signal Vdrv from the oscillator circuit 10.

Figure 3:
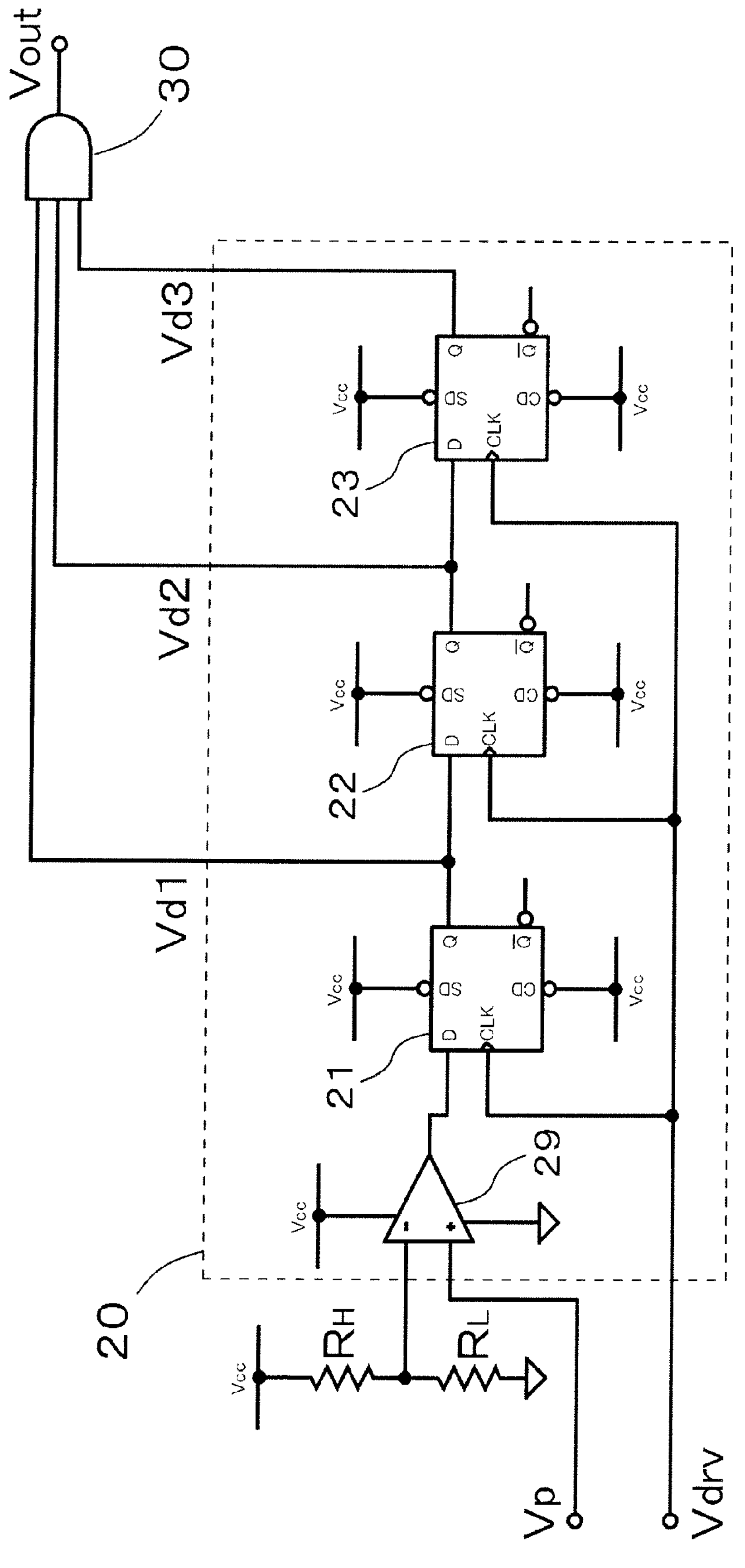
FIG. 3 is an exemplary circuit diagram of a phase judgment circuit and a powder presence/absence judgment circuit of FIG. 1 in the case of n=3.

FIG. 3 is an exemplary circuit diagram of the phase judgment circuit 20 and the powder presence/absence judgment circuit 30 of FIG. 1 in the case of n=3. The phase judgment circuit 20 includes a comparator 29 and D-type flip-flops 21 to 23 making up a three-stage shift register. The powder presence/absence judgment circuit 30 is a three-input AND gate. Input to an inverting input terminal of the comparator 29 is a reference voltage obtained by dividing a power source voltage Vcc by resistances $R_H$ and $K_L$, at a voltage division ratio of 1:1 for example. Input to a non-inverting input terminal of the comparator 29 is the terminal voltage Vp of the piezoelectric element 5. The terminal voltage Vp of the piezoelectric element 5 is converted by the comparator 29 into a binary signal, which in turn is input from an output terminal of the comparator 29 to a D-input terminal of the first stage D-type flip-flop 21. Q-output terminals of the first and second stage D-type flip-flops 21 and 22 (i.e. Q-output terminals of the first to $(n-1)^{th}$ stage D-type flip-flops) are connected respectively to D-input terminals of the second and third stage D-type flip-flops 22 and 23 (i.e. D-input terminals of the second to $n^{th}$ stage D-type flip flops). CLK terminals of the D-type flip-flops 21 to 23 each receive the output signal Vdrv from the oscillator circuit 10 and Q-output terminals thereof are connected respectively to input terminals of the powder presence/absence judgment circuit 30 (three-input AND gate).

According to the above circuit configuration, the D-type flip-flops 21 to 23 store in sequence the level of the terminal voltage Vp (after the binary conversion) of the piezoelectric element 5 at the time of each of three consecutive rises (level transitions from low to high) of the output signal Vdrv from the oscillator circuit 10 and output the levels from the Q-output terminals. Thus, the uppermost stage D-type flip-flop 21 of the shift register functions as a phase comparator circuit, and the comparison results at the D-type flip-flop 21 are shifted in sequence, for each rise of the output signal Vdrv from the oscillator circuit 10, to the subsequent stages of D-type flip-flops 22 and 23 for the storage and output. When all of the voltages at the Q-output terminals of the D-type flip-flops 21 to 23 are high, the powder presence/absence judgment circuit 30 sets the judgment result signal Vout high, whereas when at least one of the three voltages at the Q-output terminals is low, the powder presence/absence judgment circuit 30 sets the judgment result signal Vout low.

Figure 4:
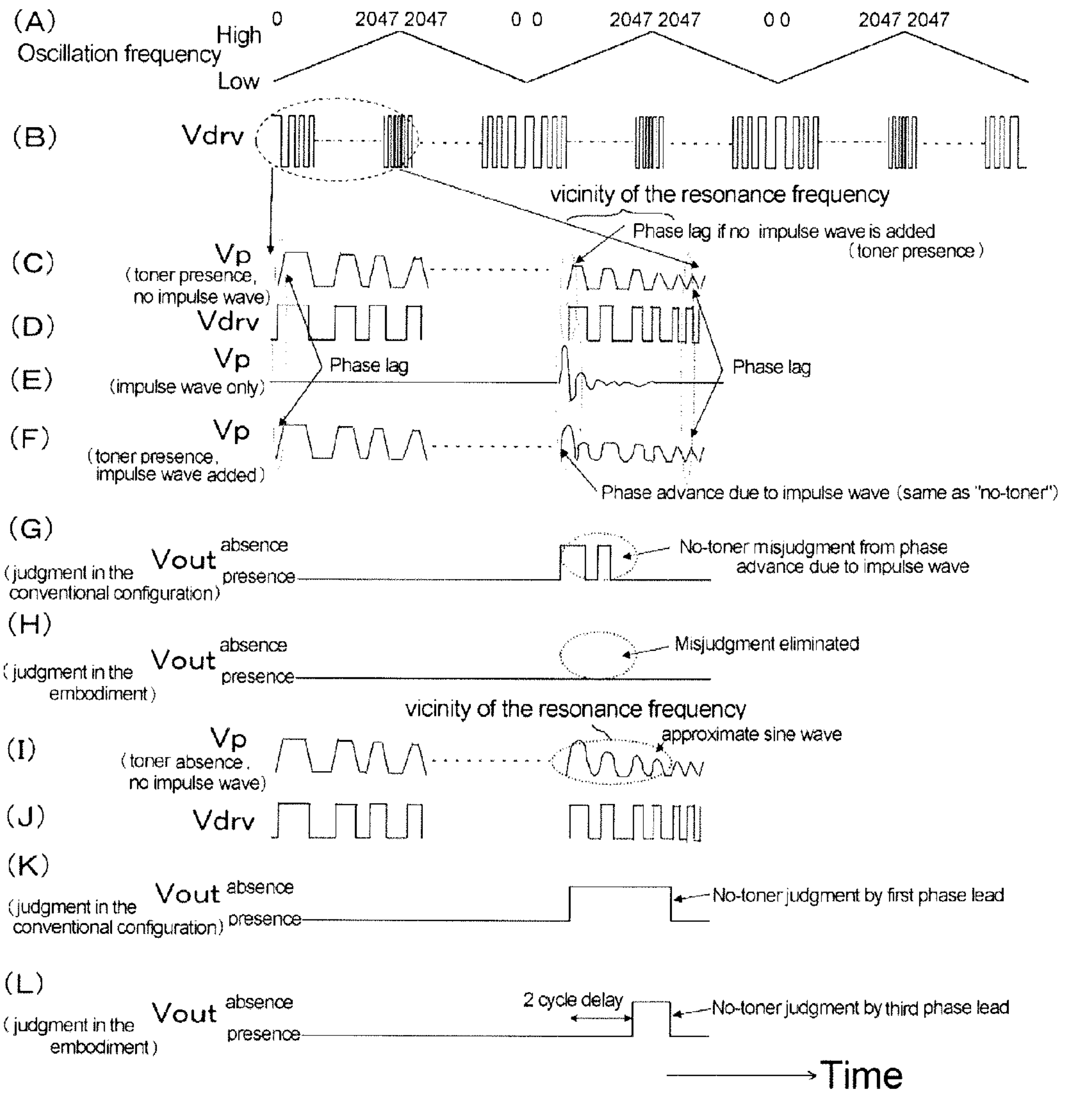
FIG. 4(A) to FIG. 4(L) are time charts of the toner sensor shown in FIG. 1.

FIG. 4(A) to FIG. 4(L) are time charts of the toner sensor shown in FIG. 1. FIG. 4(A) shows a change in the oscillation frequency of the oscillator circuit 10 when the sweep count is 11 bits ($2^{11}$ different oscillation frequencies). FIG. 4(B) is a waveform diagram of the output signal Vdrv from the oscillator circuit 10. FIG. 4(C) to FIG. 4(L) extract part of the time axis of FIG. 4(A) and FIG. 4(B) and depict them in an enlarged scale.

FIG. 4(C) is a waveform diagram of the terminal voltage Vp of the piezoelectric element 5 in the case where toner is in the toner box and where the terminal voltage Vp involves no fluctuation (hereinafter, also referred to as "impulse wave") attributable to any external vibration or shock. FIG. 4(D) is a waveform of the output signal Vdrv from the oscillator circuit 10. As is apparent from the comparison between FIG. 4(C) and FIG. 4(D), if toner is present as long as the impulse wave is absent, also in the vicinity of the resonance frequency there occurs a phase lag of the terminal voltage Vp of the piezoelectric element 5 relative to the output signal Vdrv of the oscillator circuit 10.

FIG. 4(E) is a waveform diagram (waveform diagram extracting only the impulse wave) of the terminal voltage Vp of the piezoelectric element 5 in the case of the application of an external vibration or shock without applying the output signal Vdrv from the oscillator circuit 10 thereto. In this manner, the piezoelectric element 5 generates a noise (impulse wave) when any external vibration or shock is applied thereto. However, the noise is often temporary and does not last for a long time. FIG. 4(F) is a waveform diagram (corresponding to a combination of FIG. 4(C) and FIG. 4(E)) of the terminal voltage Vp of the piezoelectric element 5 in the case where toner is present in the toner box and where the terminal voltage Vp involves the impulse wave. As shown in this diagram, depending on the influence of the impulse wave, the terminal voltage Vp of the piezoelectric element 5 rises prior to the output signal Vdrv from the oscillator circuit 10.

FIG. 4(G) is a waveform diagram of a judgment result signal Vout (sensor output) in the conventional configuration (when the terminal voltage Vp of the piezoelectric element 5 is that of FIG. 4(F)). The conventional configuration is a configuration where "no toner" is judged if at least once a phase lead is detected of the terminal voltage Vp of the piezoelectric element 5 relative to the output signal Vdrv from the oscillator circuit 10. FIG. 4(H) is a waveform diagram of the judgment result signal Vout (sensor output) in this embodiment (when the terminal voltage Vp of the piezoelectric element 5 is that of FIG. 4(F)). As shown in FIG. 4(G), in the conventional configuration, a misjudgment of "no toner" is made (the output signal rises) in spite of the presence of toner by only a single time of detection of the phase lead of the terminal voltage Vp of the piezoelectric element 5 attributable to the impulse wave. In this embodiment, on the other hand, as shown in FIG. 4(H), since "no toner" is not judged if the number of times of the phase-lead judgment is less than n times, as described in FIG. 3, etc., there occurs no misjudgment based on the temporary phase lead due to the impulse wave.

FIG. 4(I) is a waveform diagram of the terminal voltage Vp of the piezoelectric element 5 in the case where toner is absent in the toner box and where the terminal voltage Vp involves no impulse wave. FIG. 4(J) is a waveform diagram of the output signal Vdrv from the oscillator circuit 10 (identical to FIG. 4(D)). As shown in FIG. 4(I), when the toner is absent, the terminal voltage Vp of the piezoelectric element 5 approximates a sine wave in the vicinity of the resonance frequency, so that a phase lead occurs relative to the output signal Vdrv from the oscillator circuit 10.

FIG. 4(K) is a waveform diagram of a judgment result signal Vout (sensor output) in the conventional configuration (when the terminal voltage Vp of the piezoelectric element 5 is that of FIG. 4(I)). FIG. 4(L) is a waveform diagram of the judgment result signal Vout (sensor output) in this embodiment (when the terminal voltage Vp of the piezoelectric element 5 is that of FIG. 4(I)). As shown in FIG. 4(K), in the conventional configuration, a judgment of "no toner" is made (the output signal rises) by the first time of judgment of the phase lead of the terminal voltage Vp of the piezoelectric element 5 relative to the output signal Vdrv from the oscillator circuit 10. In this embodiment, on the other hand, "no toner" is judged (the output signal rises) by the third time of judgment of the phase lead of the terminal voltage Vp of the piezoelectric element 5 relative to the output signal Vdrv from the oscillator circuit 10. This is due to the above configuration where "no toner" is not judged if the number of times of the judgment of phase lead is less than three times.

According to this embodiment, the following effects can be presented.

(1) By virtue of the configuration where "no toner" is judged if the phase judgment circuit 20 makes a judgment n consecutive times that there is a phase lead of the terminal voltage Vp of the piezoelectric element 5 relative to the output signal Vdrv from the oscillator circuit 10, a misjudgment of "no toner" can be prevented if n times is not reached or exceeded by the number of times of the judgment of the phase lead of the terminal voltage Vp of the piezoelectric element 5 arising from a vibration or shock when toner is present. Consequently, as compared with the case where "no toner" is judged by only a single judgment of the phase lead of the terminal voltage Vp of the piezoelectric element 5, the misjudgment can be reduced or eliminated when a vibration or shock is applied. By the provision of the function of preventing a misjudgment attributable to a vibration or shock, this embodiment is advantageous for the size reduction susceptible to the influence of a vibration.

(2) Since the phase comparison and the toner presence/absence judgment are digitally processed in the phase judgment circuit 20 and the powder presence/absence judgment circuit 30, respectively, there is no need to consider the frequency components of the noise (impulse wave). Therefore, the misjudgment can be prevented even on the condition that the frequency components of an external noise overlap with and cannot be discriminated from the resonance frequency of the piezoelectric element 5 due to the shape of the piezoelectric element 5.

(3) Since the major part is composed of digital circuits with reduced number of discrete components such as capacitors and resistors, this embodiment is suitable for the IC configuration and advantageous for the cost reduction.

Described above is an explanation based on the embodiment. The description of the embodiments is illustrative in nature and various variations in constituting elements and processes involved are possible. Those skilled in the art would readily appreciate that such variations are also within the scope of the present invention.

Figure 5:
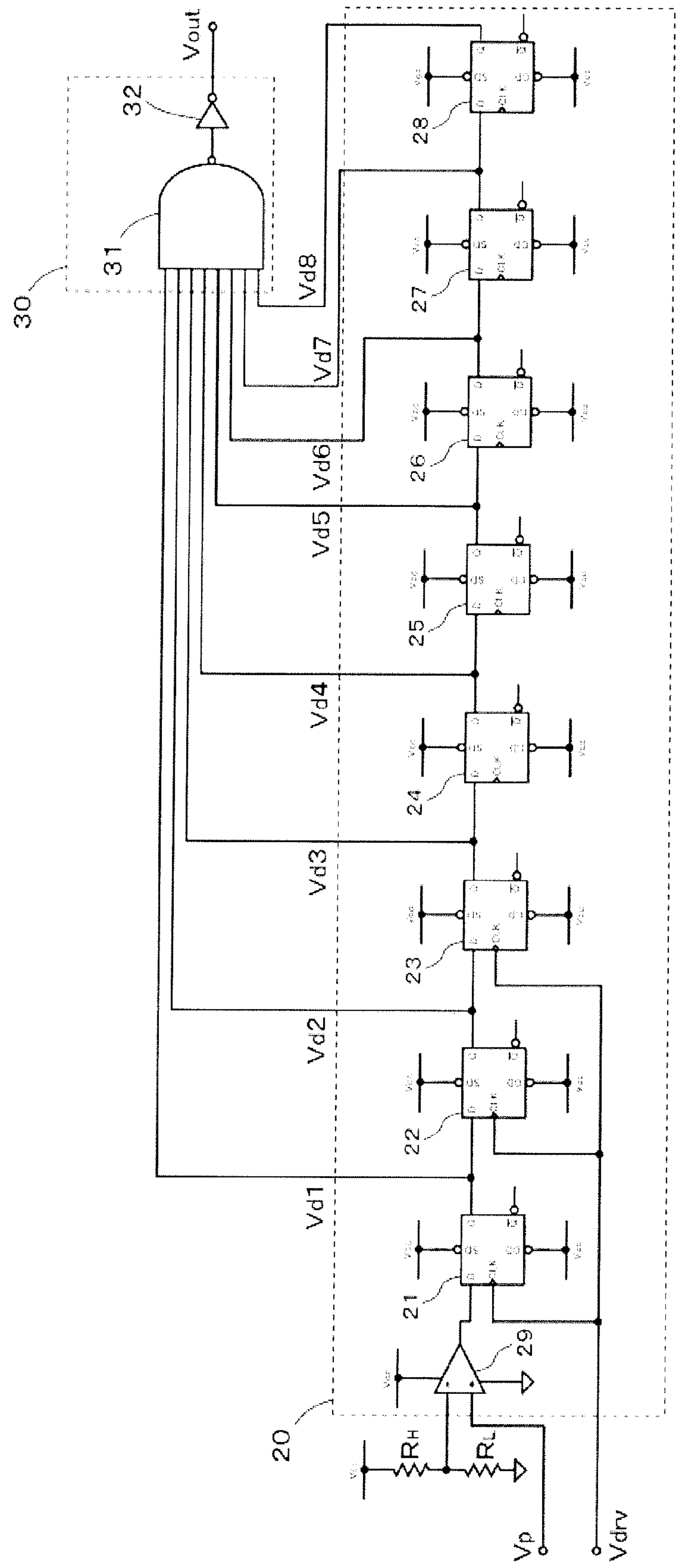
FIG. 5 is an exemplary circuit diagram of the phase judgment circuit and the powder presence/absence judgment circuit of FIG. 1 in the case of n=8.

The value of "n" may be properly set depending on required specifications. FIG. 5 is an exemplary circuit diagram of the phase judgment circuit 20 and the powder presence/absence judgment circuit 30 of FIG. 1 in the case of n=8. The phase judgment circuit 20 and the powder presence/absence judgment circuit 30 shown in this diagram are substantially the same as those shown in FIG. 3, except that the number of stages of the shift register is increased from three to eight (D-type flip-flops 21 to 28), that the number of input signals to the powder presence/absence judgment circuit 30 is increased from three to eight (Vd1 to Vd8), and that the powder presence/absence judgment circuit 30 is composed of an 8-input NAND gate and an inverter 32 (the combination of both is equivalent to an 8-input AND gate). In the phase judgment circuit 20 and the powder presence/absence judgment circuit 30 shown in this diagram, "no toner" is judged if eight consecutive times of the judgment are achieved by the phase lead of the terminal voltage Vp of the piezoelectric voltage 5 relative to the output signal Vdrv from the oscillator circuit, whereas "no toner" is not judged if the number of times of consecutive judgment of the phase lead is less than eight.

Figure 6:
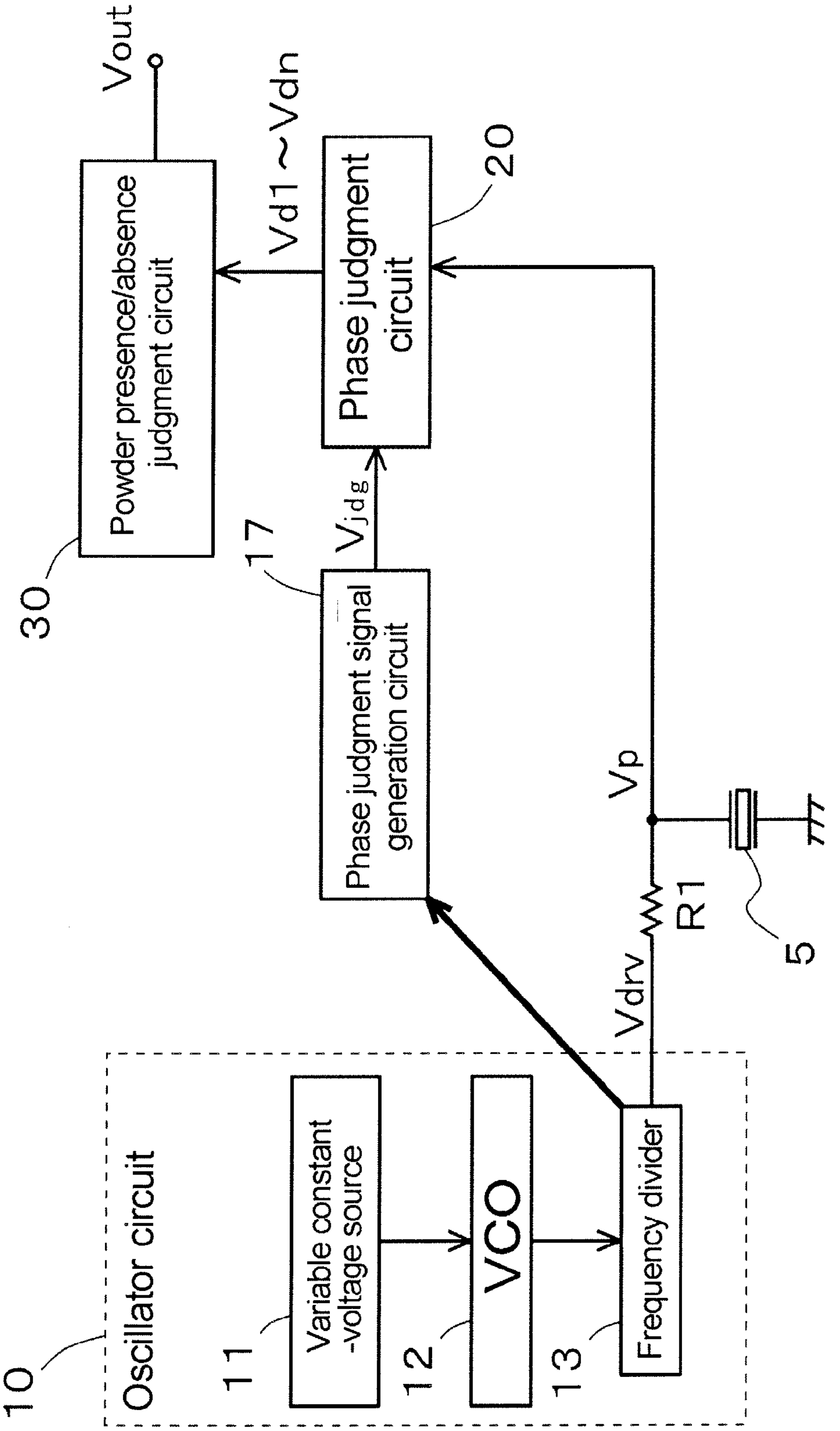
FIG. 6 is a block diagram of a toner sensor according to a variant of the embodiment of FIG. 1.

FIG. 6 is a block diagram of a toner sensor according to a variant of the embodiment of FIG. 1. In this variant, the phase judgment circuit 20 judges whether the phase lag of the terminal voltage Vp of the piezoelectric voltage 5 relative to the phase of the output signal Vdrv from the oscillator circuit is less than or equal to a predetermined angle (e.g. 11.25°).

Hereinafter, description will be made mainly of the difference from the embodiment of FIG. 1.

The oscillator circuit 10 includes a variable constant-voltage source 11, a voltage-controlled oscillator (VCO) 12, and a frequency divider 13. The voltage-controlled oscillator 12 is operated by a control voltage from the variable constant-voltage source 11. The frequency divider 13 divides an output signal from the voltage-controlled oscillator 12 at a predetermined frequency dividing ratio. The frequency dividing ratio is expressed by $2^k$ (k is an arbitrary natural number) for example and, in this variant, k is 4 or more (the frequency dividing ratio is 16 or more). If the frequency dividing ratio is $2^k$, the circuit can be simplified with enhanced efficiency, but it may be an arbitrary numerical value as long as it is an integer. The output signal Vdrv frequency-divided by the frequency divider 13 is applied via a resistor R1 to the piezoelectric element 5. By varying the voltage of the variable constant-voltage source 11, the frequency of the output signal Vdrv is swept over a frequency range including the resonance frequency Fr of the piezoelectric element 5.

Figure 7:
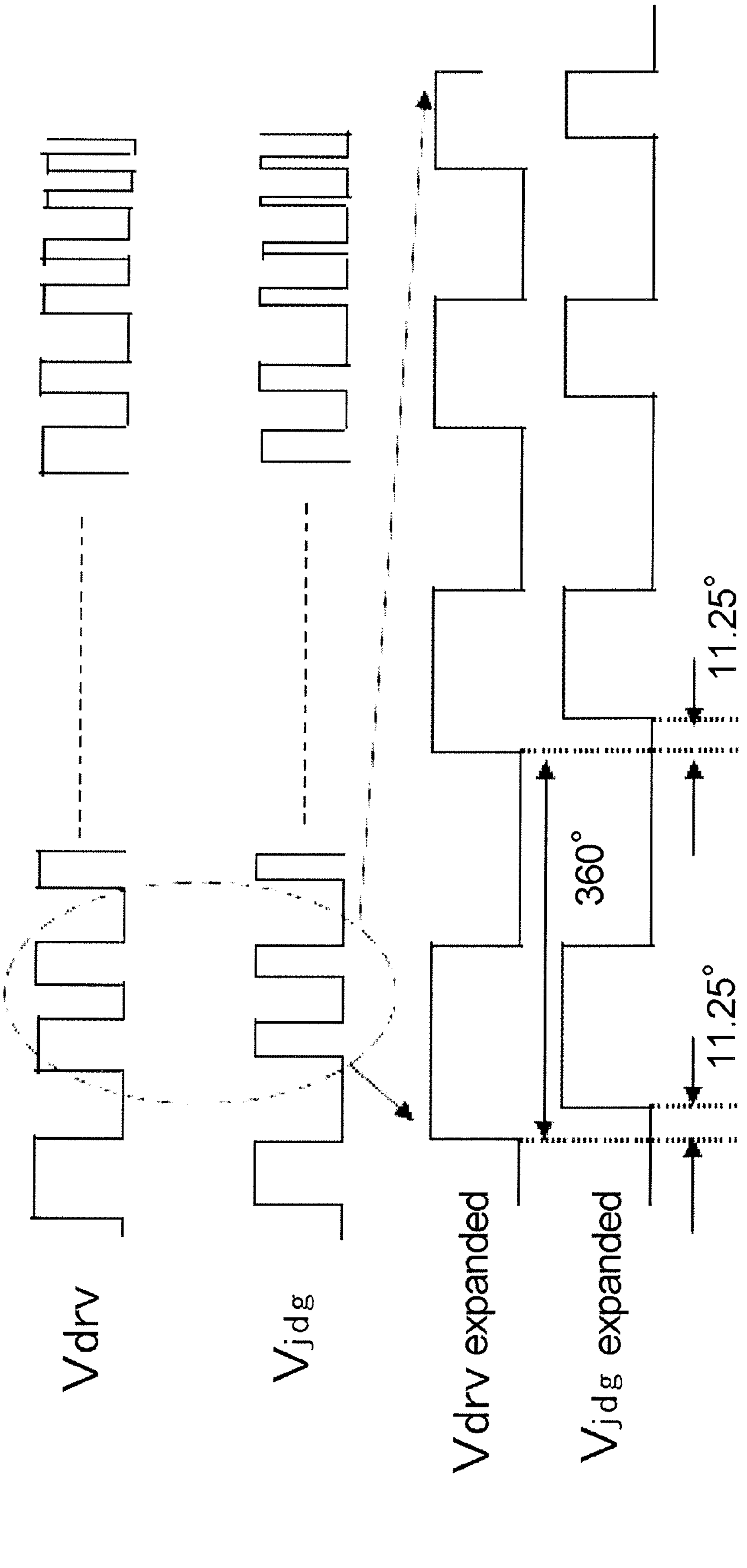
FIG. 7 is an exemplary waveform diagram of an output signal Vdrv from an oscillator circuit and a phase judgment signal $V_{jdg}$ in FIG. 6.

Instead of the output signal Vdrv from the oscillator circuit 10, the phase judgment circuit 20 receives a phase judgment signal $V_{jdg}$ having the same cycle as that of the output signal Vdrv and having a phase delayed by a predetermined angle (e.g. 11.25°) from that of the output signal Vdrv. FIG. 7 shows an exemplary waveform of the output signal Vdrv from the oscillator circuit 10 and the phase judgment signal $V_{jdg}$. The phase of the phase judgment signal $V_{jdg}$ may be properly shifted if it is anticipated to be affected by the delay by peripheral circuits. The phase judgment signal $V_{jdg}$ may be generated by a phase judgment signal generation circuit 17 using a logical operation that uses oscillation signals (e.g., output signals from the upper stage of the frequency divider 13 included in the oscillator circuit 10) having frequencies which are e.g. 2 times, 4 times, 8 times, and 16 times as high as that of the output signal Vdrv from the oscillator circuit 10. The phase comparison result signals Vd1 to Vdn are binary signals each having a different level depending on whether the terminal voltage Vp of the piezoelectric element 5 has a phase lag or a phase lead relative to the phase judgment signals $V_{jdg}$ (i.e. whether the phase lag relative to the output signal Vdrv from the oscillator circuit 10 is the predetermined angle or less). The powder presence/absence judgment circuit 30 makes a judgment that toner is absent if the phase judgment circuit 20 makes a judgment n consecutive times that the phase lag of the terminal voltage Vp of the piezoelectric element 5 relative to the output signal Vdrv from the oscillator circuit 10 is less than or equal to the predetermined angle.

Toner to be detected is not limited to the toner exemplified in the embodiment and the variant.

What is claimed is:

1. A powder sensor comprising:

a piezoelectric element;

an oscillator circuit that applies to the piezoelectric element an output signal having a frequency equal to or near a resonance frequency of the piezoelectric element;

a phase determination circuit that determines a phase of a terminal voltage of the piezoelectric element relative to a phase of the output signal from the oscillator circuit; and a powder presence/absences determination circuit that determines whether powder is present or absent based on results of determination of the phase determination circuit, wherein the phase determination circuit includes an n-stage shift register (where "n" is an integer and at least 2), the n-stage shift register stores in a first stage of the n-stage shift register a level of the terminal voltage as a binary signal of the piezoelectric element at each of predetermined level transitions of a phase judgment signal, which has a cycle that is the same as the cycle of the output signal of the oscillator circuit, the n-stage register shifts the binary signal to a subsequent stage of the n-stage shift register, the n-stage shift register outputs, n consecutive times, the level of the terminal voltage as binary signal of the piezoelectric element at each of the predetermined level transitions, and the powder presence/absence determination circuit determines that powder is absent if every output signal of each stage of the n-stage shift register is at a predetermined level.

2. The powder sensor according to claim 1, wherein the oscillator circuit is a sweep oscillator circuit that sweeps the frequency of the output signal through a frequency range inclusive of a resonance frequency of the piezoelectric element.

3. The powder sensor according to claim 1, wherein the powder presence/absence determination circuit includes a logic gate that receives, as an input, the output signal of each stage of the n-stage shift register.

4. The powder sensor according to claim 1, wherein the phase judgment signal is the output signal of the oscillator circuit.

5. The powder sensor according to claim 1, wherein the phase judgment signal has a phase delayed by a predetermined angle from the phase of the output signal of the oscillator circuit.

6. The powder sensor according to claim 1, including a converter converting the terminal voltage of the piezoelectric element to the binary signal, an inputting the binary signal to the first stage of the n-stage shift register.

* * * * *